(12) United States Patent
Wang et al.

(10) Patent No.: US 9,952,310 B2
(45) Date of Patent: Apr. 24, 2018

(54) AIRCRAFT WEATHER RADAR COVERAGE SUPPLEMENTING SYSTEM

(71) Applicant: Honeywell International Inc., Morristown, NJ (US)

(72) Inventors: Guoqing Wang, Beijing (CN); Haifeng Wang, Beijing (CN); Kenneth R. Jongsma, Tijeras, NM (US)

(73) Assignee: Honeywell International Inc., Morris Plains, NJ (US)

( * ) Notice: Subject to any disclaimer, the term of this patent is extended or adjusted under 35 U.S.C. 154(b) by 423 days.

(21) Appl. No.: 14/821,547

(22) Filed: Aug. 7, 2015

(65) Prior Publication Data

US 2017/0038457 A1   Feb. 9, 2017

(51) Int. Cl.
  *G01S 13/95* (2006.01)
  *G01S 7/00* (2006.01)
  *G06K 9/62* (2006.01)
(52) U.S. Cl.
  CPC .............. *G01S 7/003* (2013.01); *G01S 13/95* (2013.01); *G01S 13/951* (2013.01); *G01S 13/953* (2013.01); *G06K 9/6288* (2013.01)
(58) Field of Classification Search
  CPC ...... G01S 13/95; G01S 13/951; G01S 13/953; G01S 13/958
  See application file for complete search history.

(56) References Cited

U.S. PATENT DOCUMENTS 5,265,024 A   11/1993  Crabill et al.
6,014,606 A *  1/2000  Tu ........................ G01W 1/08
                                              342/26 A
6,043,756 A *  3/2000  Bateman ................ G01S 7/003
                                              340/945
6,381,538 B1   4/2002  Robinson et al.
6,441,773 B1   8/2002  Kelly et al.
(Continued)

FOREIGN PATENT DOCUMENTS

EP        2256957 A2    12/2010

OTHER PUBLICATIONS

Extended European Search Report from counterpart European Application No. 16182109.5, dated Dec. 2, 2016, 8 pp.
(Continued)

*Primary Examiner* — Peter Bythrow
(74) *Attorney, Agent, or Firm* — Shumaker & Sieffert, P.A.

(57) ABSTRACT

In one example, this disclosure is directed to a system configured to receive weather data from one or more weather data sources. The system is further configured to receive, from a requesting weather radar system, a request for supplemental weather data covering an identified region, wherein the requesting weather radar system is associated with a specific weather radar data format. The system is further configured to identify a set of supplemental weather data for the identified region, based on the received weather data from the one or more weather data sources, wherein the supplemental weather data is in the specific weather radar data format associated with the requesting weather radar system and comprises weather forecast information for the identified region. The system is further configured to transmit the supplemental weather data for the identified region to the requesting weather radar system.

25 Claims, 8 Drawing Sheets

(56) References Cited

U.S. PATENT DOCUMENTS

| | | | |
|---|---|---|---|
| 6,448,922 B1 | 9/2002 | Kelly | |
| 6,456,226 B1 | 9/2002 | Zheng et al. | |
| 6,501,392 B2* | 12/2002 | Gremmert | G01S 7/003 340/945 |
| 6,563,452 B1 | 5/2003 | Zheng et al. | |
| 6,828,922 B1* | 12/2004 | Gremmert | G01S 7/003 340/949 |
| 6,917,297 B2 | 7/2005 | Andrews et al. | |
| 7,027,898 B1 | 4/2006 | Leger et al. | |
| 7,471,995 B1* | 12/2008 | Robinson | G01C 23/00 340/901 |
| 7,612,688 B1 | 11/2009 | Vigeant-Langlois et al. | |
| 7,633,428 B1 | 12/2009 | McCusker et al. | |
| 7,949,330 B2 | 5/2011 | Yuhara et al. | |
| 8,022,859 B2 | 9/2011 | Bunch et al. | |
| 8,159,369 B1 | 4/2012 | Koenigs et al. | |
| 8,217,828 B2* | 7/2012 | Kirk | G01W 1/08 342/26 R |
| 8,660,719 B2 | 2/2014 | Barraci et al. | |
| 9,019,146 B1 | 4/2015 | Finley et al. | |
| 9,223,020 B1* | 12/2015 | Crosmer | G01S 13/951 |
| 2002/0039072 A1* | 4/2002 | Gremmert | G01S 7/003 340/945 |
| 2005/0278120 A1* | 12/2005 | Manfred | G01W 1/08 702/2 |
| 2008/0035784 A1* | 2/2008 | Meserole | G08G 5/0008 244/3.1 |
| 2009/0219197 A1* | 9/2009 | Bunch | G01S 7/003 342/26 B |
| 2011/0054718 A1* | 3/2011 | Bailey | G01W 1/08 701/3 |
| 2011/0074624 A1* | 3/2011 | Bunch | G01S 7/003 342/26 D |
| 2011/0090111 A1* | 4/2011 | Stagliano, Jr. | G01S 7/025 342/26 R |
| 2012/0086596 A1* | 4/2012 | Insanic | G01S 7/003 342/26 D |
| 2014/0097979 A1* | 4/2014 | Nohara | G01S 7/003 342/90 |
| 2015/0304813 A1* | 10/2015 | Esposito | H04B 7/155 455/456.2 |
| 2015/0310747 A1* | 10/2015 | Frolik | B64D 45/00 340/971 |
| 2016/0011741 A1* | 1/2016 | Khatwa | G06F 3/04817 715/765 |
| 2016/0131758 A1* | 5/2016 | Christianson | G01S 13/95 342/26 R |
| 2016/0274233 A1* | 9/2016 | Maravelias | G01S 13/951 |
| 2016/0274271 A1* | 9/2016 | Lukas | G01W 1/02 |

OTHER PUBLICATIONS

Response to Communication dated Feb. 13, 2017, from counterpart European Application No. 16182109.5, filed on Aug. 7, 2017, 13 pp.
Moore, "RDR-4000 IntuVue™ Weather Radar Pilot Training for Airbus Aircraft," Honeywell Inc., Aug. 7, 2013, 116 pp.
"Honeywell Enhances Weather Radar to Boost Safety," Aviation Week & Space Technology, retrieved from http://aviationweek.com/awin/honeywell-enhances-weather-radar-boost-safety, Sep. 3, 2013, 3 pp.
Stough III et al., "New Technologies for Reducing Aviation Weather-Related Accidents," NASA, retrieved from http://ntrs.nasa.gov/archive/nasa/casi.ntrs.nasa.gov/20060048302.pdf on Aug. 6, 2015, 10 pp.
Wolfson et al., "Consolidated Storm Prediction for Aviation (CoSPA)," 13th Conference on Aviation, Range and Aerospace Meteorology, Paper J6.5, American Meteorological Society, Jan. 21-24, 2008, 16 pp.

* cited by examiner

AIRCRAFT WEATHER RADAR COVERAGE SUPPLEMENTING SYSTEM

BACKGROUND

An aircraft may use an onboard weather radar system to detect adverse weather conditions, which may enable the flight crew to make changes to the flight plan as necessary to avoid potentially hazardous weather. The onboard weather radar system may be mounted on the aircraft and may use radar scans to detect reflected radar signals from weather formations such as convective weather cells associated with turbulence, rain, lightning, and hail. Up-to-date weather information may assist the flight crew of the aircraft in evaluating whether or how to modify a flight plan to ensure safety of the flight, as well as to promote fuel efficiency, time efficiency, and passenger comfort. The onboard weather radar system may control weather radar scanning and may process radar return signals to present a visual weather radar display. An aircraft in flight may also receive information from Air Traffic Control (ATC) which may use information from ground-based weather radar stations to identify convective weather regions that represent hazardous areas for aircraft operations, and direct aircraft to steer clear of hazardous areas as they are detected.

SUMMARY

This disclosure is directed to techniques, systems, devices, and methods for a centralized system for integrating weather data from any of one or more aircraft and one or more other radar or sensor nodes; storing or integrating the weather data from the various weather data sources, including weather forecast information such as changes in the weather data over time, in a data format matching a data format of at least one participating weather radar system; and making portions of the integrated data available to requesting weather radar systems from among the participating systems. For example, a weather data integrating system may store the weather data from various aircraft weather radar systems and other weather data sources in the form of three-dimensional (3D) volumetric buffer weather data that matches the data format of a modern aircraft-mounted weather radar system. A participating aircraft weather radar system onboard an own aircraft in flight may perform radar scans of convective weather cells that are highly radar-reflective, and may identify one or more regions of sky behind the forward highly reflective weather cells that are obscured to the own aircraft weather radar because the forward weather cells have largely or completely reflected the radar signal, and prevented the own aircraft's weather radar signals from scanning the obscured regions. The own aircraft weather radar system may then send a request to the weather data integrating system for supplemental weather data coverage of the one or more identified obscured regions.

The weather data integrating system may receive the request and may identify, from its own data store, weather data from one or more other weather data sources that cover the one or more identified regions that are obscured to the requesting weather radar system. The weather data integrating system may have the weather data in the specific data format used by or associated with the requesting weather radar system, such as a three-dimensional (3D) volumetric buffer weather data format, and may convert the weather data into the specific data format associated with the requesting weather radar system if needed. The weather data integrating system may track the incoming weather data from the various sources over time, and store weather forecast information based on the changes in the weather data over time. The weather forecast information may include motions of weather features and trend information for weather features in the identified region. The weather data integrating system may respond to the request by transmitting, to the requesting weather radar system, supplemental weather data from the other weather data sources, including weather forecast information, in the specific data format of the requesting weather radar system.

One example is directed to a system configured to receive weather data from one or more weather data sources. The system is further configured to receive, from a requesting weather radar system, a request for supplemental weather data covering an identified region, wherein the requesting weather radar system is associated with a specific weather radar data format. The system is further configured to identify a set of supplemental weather data for the identified region, based on the received weather data from the one or more weather data sources, wherein the supplemental weather data is in the specific weather radar data format associated with the requesting weather radar system and comprises weather forecast information for the identified region. The system is further configured to transmit the supplemental weather data for the identified region to the requesting weather radar system.

Another example is directed to a weather radar system comprising one or more processors configured to perform a weather radar scan to generate an own weather radar data set. The one or more processors are configured to identify a region having insufficient data in the own weather radar data set. The one or more processors are further configured to transmit, to a weather data integrating system, a request for supplemental weather data covering the identified region. The one or more processors are further configured to receive, front the weather data integrating system, a set of supplemental weather data for the identified region, wherein the supplemental weather data is in a specific weather radar data format used by the weather radar system, and comprises weather forecast information for the identified region. The one or more processors are further configured to output for display, on a weather radar display system, a weather radar display based in part on the own weather radar data set, wherein the weather radar display comprises a supplemental weather display portion for the identified region having insufficient data in the own weather radar data set, wherein the supplemental weather display portion is based at least in part on the supplemental weather data received from the weather data integrating system.

Another example is directed lo a method for providing supplemental weather radar coverage. The method includes receiving, by the one or more processors, weather data from one or more weather data sources. The method further includes receiving, by the one or more processors from a requesting weather radar system, a request for supplemental weather data covering an identified region, wherein the requesting weather radar system is associated with a specific weather radar data format. The method further includes identifying, by the one or more processors, a set of supplemental weather data for the identified region, based on the received weather data front the one or more weather data sources, wherein the supplemental weather data is in the specific weather radar data format associated with the requesting weather radar system and comprises weather forecast information for the identified region. The method further includes outputting for transmission, by the one or more processors, the supplemental weather data for the identified region to the requesting weather radar system.

Another example is directed to a device comprising a computer-readable medium having program code stored thereon, the device configured for the program code to be executable by one or more processors to receive, via a remote coverage broadband datalink system, one or more sets of data from one or more data collecting nodes. The program code is further executable by the one or more processors for causing the one of more processors to receive weather data from one Of more weather data sources. The program code is further executable by the one or more processors for causing the one or more processors to receive, from a requesting weather radar system, a request for supplemental weather data covering an identified region, wherein the requesting weather radar system is associated with a specific weather radar data format. The program code is further executable by the one or more processors for causing the one or more processors to identify a set of supplemental weather data for the identified region, based on the received weather data from the one or More weather data sources, wherein the supplemental weather data is in the specific weather radar data format associated with the requesting weather radar system and comprises weather forecast information for the identified region. The program code is further executable by the one or more processors for causing the one or more processors to The program code is further executable by the one or more processors for causing the one or more processors to transmit the supplemental weather data for the identified region to the requesting weather radar system.

The disclosure is also directed to an article of manufacture comprising a computer. readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent front the description and drawings, and from the claims.

DETAILED DESCRIPTION

Weather data integrating techniques, systems, devices, and methods of this disclosure may enable providing supplemental weather data to aircraft in flight to supplement an aircraft's own weather radar, such as in regions where the aircraft's own weather radar coverage is obscured by highly radar-reflective weather features such as storm clouds. Various examples of weather data integrating and weather radar coverage supplementing techniques, systems, devices, and methods are further described below.

Figure 1:
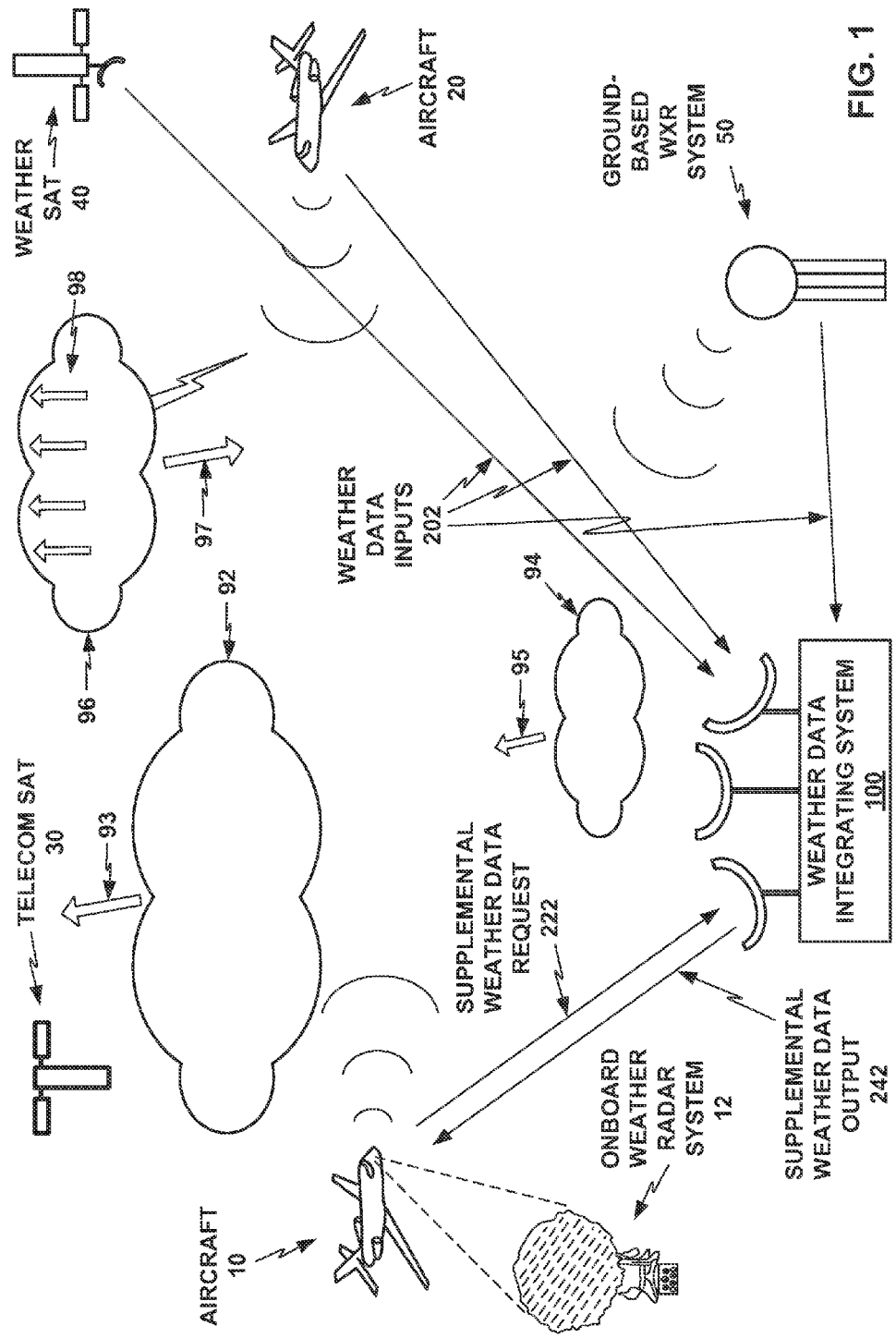
FIG. 1 depicts a conceptual block diagram of an example weather data integrating system configured for receiving and integrating weather data and transmitting supplemental weather data to requesting weather radar systems, in one example.

FIG. 1 depicts a conceptual block diagram of an example weather data integrating system 100 configured for receiving and integrating weather data and transmitting supplemental weather data to requesting weather radar systems. For example, weather data integrating system 100 is configured to receive weather radar data from participating aircraft, such as representative aircraft 10 and 20 which are each equipped with aircraft-mounted weather radar systems. Aircraft 10 is equipped with onboard weather radar system 12, and may operate weather radar system 12 to collect radar data characterizing the weather proximate to and along the heading of aircraft 10. (Weather radar data transmitted by onboard weather radar system 12 may be interchangeably referenced as weather radar data from aircraft 10, and communications or transmissions to or from onboard weather radar system 12 may be interchangeably referenced as being to or from aircraft 10, for purposes of this disclosure.) Onboard weather radar system 12 onboard aircraft 10 may be configured to process weather radar data it collects and automatically transmit the weather radar data via telecommunication satellite 30 to weather data integrating system 100, Aircraft 20 may be operating proximate to (e.g., within tens or hundreds of miles of) aircraft 10, Aircraft 20 in this example is also equipped with a weather radar system (not separately shown) that may also be configured to process weather radar data collects and automatically transmit the weather radar data via telecommunication satellite 30 to weather data integrating system 100.

Weather data integrating system 100 is further configured to receive weather radar from participating additional, non-aircraft weather radar platforms such as ground-based weather radar (WXR) system 50. Ground-based weather radar system 50 may be part of a network of ground-based weather radar systems such as the Next Generation Weather Radar System (NexRad) radar network operated by the National Weather Service it the United States, for example. Weather data integrating system 100 is also configured to receive additional weather data from non-radar weather data gathering platforms such as weather satellite 40, which may scan weather formations in microwave, infrared, or other wavelength from orbit, for example, Aircraft 10, 20, ground-based weather radar system 50, and weather satellite 40 as shown in FIG. 1 are representative examples of weather data collecting systems, which may also include any number of aircraft, other air-based weather radar and/or weather sensing platforms, ground-based weather radar and/or weather sensing systems, sea-based weather radar and/or weather sensing platforms, satellites or other space-based weather radar and/or weather sensing platforms, and various other vehicles, platforms, or assets equipped with weather radar and/or weather sensing systems. Weather data integrating system 100 may integrate the weather data it receives from the various weather data sources such as aircraft 10 and 20, ground-based weather system 50, and weather satellite 40, and transmit portions of the integrated weather data to a requesting weather radar system such as onboard aircraft 10, as further described as follows.

Aircraft 10 as shown in FIG. 1 is flying toward an area of sky containing convective weather cells 92, 94, 96, Aircraft 20 as shown in FIG. 1 is also flying toward the area of sky containing convective weather cells 92, 94, 96 from approximately the opposite direction. Convective weather cell 96 is hidden behind convective weather cell 92 from the current point of view of aircraft 10. Convective weather cell 92 is also highly radar-reflective, such as due to high levels of internal precipitation, such that convective weather cell 92 strongly reflects the weather radar signal from the weather radar signal of aircraft 10 and saturates the gain of the weather radar receiver of the weather radar system onboard aircraft 10, in this example. Convective weather cell 92 thus obscures the region behind it, a region that includes convective weather cell 96, from the view of aircraft 10 and onboard weather radar system 12 on aircraft 10 in this example.

The flight crew of aircraft 10 may use an onboard graphical weather radar display system (not shown in FIG, 1; shown in subsequent figures and further described below with reference thereto) that shows weather features based on the radar signals of the onboard weather radar system 12, and that displays graphical representations of convective weather cells 92 and 94. The onboard weather radar system of aircraft 10 may also detect that convective weather cell 92 has reflected its radar signals to sufficient degree to saturate the gain of onboard weather radar system 12 and obscure the region behind convective weather cell 92 from radar detection. Onboard weather radar system 12 of aircraft 10 may measure or characterize the areas surrounding the obscured region and identify the obscured region, such as by identifying the areas and dimensions of the radar-visible areas surrounding the obscured region.

In some examples, onboard weather radar system 12 may measure how the signal-to-noise (SNR) ratio of the returned radar signal drops off around the boundaries of the obscured region, and use a selected SNR value in defining the boundary of the obscured region, where the onboard weather radar system defines the boundary of the obscured region in terms of areas of sky returning below the selected SNR value. Thus, identifying the region obscured from radar may include onboard weather radar system 12 formulating a characterization of the spatial boundaries of the obscured region. That is, onboard weather radar system 12 may be configured such that identifying a region as having insufficient data in the own weather radar data set of onboard weather radar system 12 may include identifying a region obscured by a forward weather cell sufficiently reflective to attenuate radar coverage of the rearward obscured region, behind the forward weather cell, below a nominal signal-to-noise (SNR) threshold.

When onboard weather radar system 12 of aircraft 10 detects that a region of sky is obscured from radar and does not return a signal that the onboard weather radar system may use in generating a graphical weather radar display output, onboard weather radar system 12 may prepare and transmit a request for supplemental weather data to weather data integrating system 100. If onboard weather radar system 12 anticipates that the latency in receiving, processing, and displaying the supplemental weather radar data from weather data integrating system 100 in response to the request may be long enough to be human-perceptible (e.g., more than 200 milliseconds), onboard weather radar system 12 may also initially indicate such an area identified as having little or no radar data with a special graphical indication on the graphical weather radar display output, such as hashed magenta lines, in one example. Onboard weather radar system 12 may also use any other type of initial graphical representation of the identified obscured region in the onboard graphical radar display for the use of the flight crew. Such an initial indication of an identified obscured region in the onboard graphical radar display may substitute for simply not showing any data in the graphical weather radar display, which might potentially be confused for a region of clear weather.

Convective weather cells 92, 94, and 96 are in motion in the example of FIG. 1, conceptually indicated by weather cell motion vectors 93, 95, and 97, respectively. Convective weather cell 96 is also growing vertically in the example of FIG. 1, a common and potentially hazardous condition among convective weather cells (e.g., cumulus clouds associated with strong winds, turbulence, storms, and lightning), conceptually indicated in FIG. 1 by weather cell altitude growth trend vectors 98. Onboard weather radar system 12 may detect the motions of convective weather cells 92, 94 over time, and output an indication of the motions of the convective weather cells 92, 94 in the onboard graphical weather radar display. For example, onboard weather radar system 12 may detect the horizontal motions of convective weather cells 92, 94 Over time, such as in terms of radial horizontal motions (toward and away front aircraft 10) and tangential horizontal motions (side-to-side from the perspective of aircraft 10), which onboard weather radar system 12 may also detect in terms of or translate into north-south and east-west components of horizontal motion. Onboard weather radar system 12 may also detect reflectivity trends in convective weather cells 92, 94 over time, which may be indicative of whether convective weather cells 92, 94 are dissipating or growing larger and stronger.

Onboard weather radar system 12 may enable display of forecasted future positions of convective weather cells 92, 94 based on the positions and motions of convective weather cells 92, 94. The flight crew of aircraft 10 may consider the positions and motions of convective weather cells 92, 94, or the forecasted future positions of convective weather cells 92, 94 indicated by the onboard weather radar system based on the positions and motions of convective weather cells 92, 94, in evaluating whether to maintain course and speed or to change the aircraft 10 to a new heading and/or altitude. In the example shown in FIG. 1, the positions and motions of convective weather cells 92 and 94 may be such that aircraft 10 would not intercept either of convective weather cells 92 and 94 on its current speed, heading, and altitude. However, onboard weather radar system 12 does not detect convective weather cell 96 in the obscured region behind convective weather cell 92 from the point of view of aircraft 10 at the present time as shown in FIG. 1.

Weather data integrating system 100 may receive the request for supplemental weather data for the from onboard weather radar system 12 of aircraft 10, as mentioned above; identify up-to-date weather data for the identified obscured region, including weather forecast information, and in the format of requesting weather radar system 12 onboard aircraft 10; and transmit the supplemental weather data to the requesting weather radar system 12 onboard aircraft 10. Weather data integrating system 100 may identify the weather data for the identified obscured region by retrieving or generating weather data from or based on recently received or stored weather data from any one or more weather data sources, such as the weather radar system onboard aircraft 20, ground-based weather radar system 50, and weather satellite 40. Weather data integrating system 100 may receive the weather data in the same format as the requesting weather radar system 12 and store it in the same format, such as for weather radar data received from the same or similar models of aircraft-based weather radar systems, or received front other weather radar systems that use a common format with the requesting weather radar system. Weather data integrating system 100 may confirm that the data received from such other weather radar systems is in the correct format during initial evaluation and processing of the weather radar data when it is received.

Weather data integrating system 100 may also receive weather data from various data sources in any other type of format, and may perform processing to transform or convert the weather data from those various data sources, including weather radar data in other weather radar formats or other weather data in any format, into weather radar data of the same format as the requesting weather radar system 12. Weather data integrating system 100 may also host more than one weather data format for requesting weather radar systems that use various data formats, and may transform incoming weather data into each of various weather radar data formats, and maintain parallel sets of weather data in each of the various weather radar data formats ready to serve to requesting weather radar data systems that may use any of the hosted weather data formats.

FIG. 1 shows the communications among various aircraft and systems in simplified conceptual form. FIG. 1 conceptually shows weather data inputs 202 from aircraft 20, ground-based weather radar system 50, and weather satellite 40 to weather data integrating system 100; an incoming supplemental weather data request 222 from aircraft 10 to weather data integrating system 100; and a supplemental weather data output 242 transmitted from weather data integrating system 100 to aircraft 10. These communications between aircraft 10 and 20, weather radar system 50, weather satellite 40, and weather data integrating system 100 may be implemented via broadband datalink signals by way of one or more telecommunication satellites 30 in some examples, as further described below with reference to FIG. 2.

Figure 2:
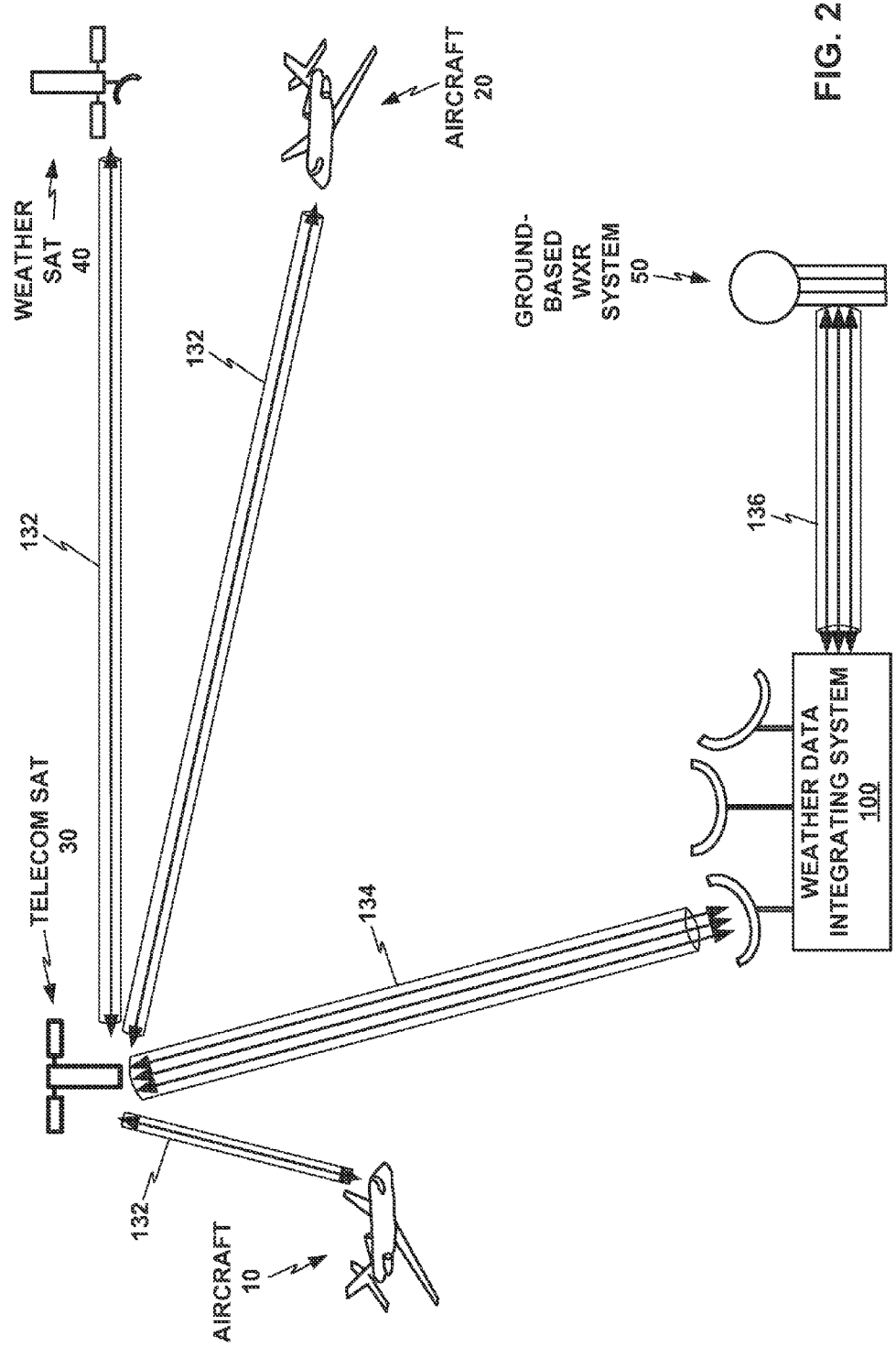
FIG. 2 shows aircraft, ground-based weather radar system, weather satellite, weather data integrating system, and telecommunications satellite, and communicative data link connections among them, in one example.

FIG. 2 shows aircraft 10 and 20, ground-based weather radar system 50, weather satellite 40, weather data integrating system 100, and telecommunications satellite 30, and communicative datalink connections among them. In particular, aircraft 10 and 20 and weather satellite 40 may be configured to maintain radio broadband datalink connections 132, with telecommunication satellite 30; weather data integrating system 100 may be configured to maintain a radio broadband datalink connection 134 with telecommunication satellite 30; and ground-based weather radar system 50 may be configured to maintain a hard-line broadband network connection 136 with weather data integrating system 100. Telecommunication satellite 30 may be equipped with broadband capability, such as Ka band datalink transmission and reception capability, in some examples. In one example, telecommunication satellite 30 may be a Global Xpress (GX) satellite operated by Inmarsat PLC. Telecommunication satellite 30 may be in geosynchronous Earth orbit (GEO) and may provide coverage over a large area of the Earth in some examples, and may interoperate with additional comparable telecom sats that may provide complementary coverage over other large sections of the Earth, in some examples.

Weather data integrating system 100 may also be configured to operate with other types of remote coverage broadband datalink systems such as broadband datalink connections implemented by drones or automated airships, for example, and may receive data directly from weather satellite 40 via direct transmissions from weather satellite 40 in some examples. Aircraft 10 and 20, ground-based weather radar system 50, weather satellite 40, and other weather data collecting systems may thus communicate weather data to weather data integrating system 100. Aircraft 10 or 20 (or interchangeably, the onboard weather radar systems thereof) may also thus transmit requests to weather data integrating system 100, and weather data integrating system 100 may transmit supplemental weather data back to aircraft 10 or 20 (or interchangeably, the onboard weather radar systems thereof) in response to those requests.

Figure 3:
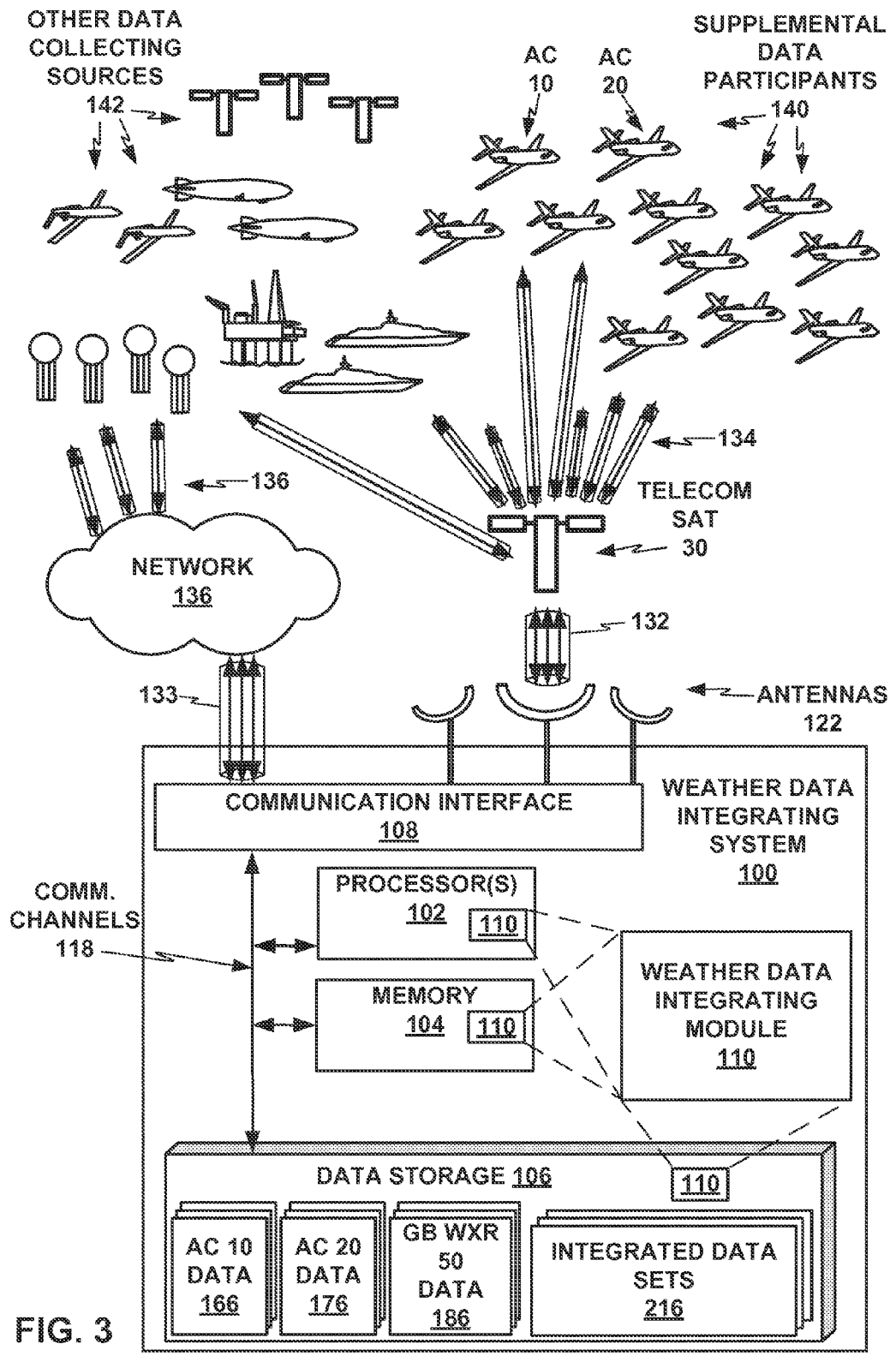
FIG. 3 shows a weather data integrating system in additional detail, and shows additional examples of participating aircraft and other weather data collecting nodes that may be in communication with a weather data integrating system.

FIG. 3 shows weather data integrating system 100 in additional detail, and shows additional examples of participating aircraft and other weather data collecting nodes that may be in communication with weather data integrating system 100. Weather data integrating system 100 as shown in FIG. 3 may be configured for receiving weather data from various participant systems 140 and other data collecting nodes 142, integrating the weather data, and transmitting portions of the integrated weather data as supplemental weather data to various participant systems 140, in various examples. Weather data integrating system 100 as shown in FIG. 3 may be a more detailed view of the same weather data integrating system 100 as shown in FIG. 1.

As shown in FIG. 3, weather data integrating system 100 includes one or more processors 102 ("processors 102") (e.g., CPUs), one or more memory components 104 ("memory 104") (which may host in-memory data stores), one or more data storage devices 106 ("data storage 106") (e.g., hard disc drives or flash drives, which may host databases or schemaless data stores), and a communication interface (CI) 108 (e.g., including a network connection and a Ka band radio interface), which is connected to a hard-line broadband network connection 133 to a network 136 (e.g., the Internet) and via. antennas 122 to radio broadband datalink connection 134 with telecommunication satellite 30. Weather data integrating system 100 is thus configured to maintain broadband datalink connections 132, 134, 136 with a variety of supplemental data participants (including aircraft 10 and 20) and with a variety of other weather data collecting nodes, potentially including ground-based weather radar systems, weather satellites, and other sea-based, ground-based, air-based, and space-based data collecting nodes.

The sea-based data collecting nodes may include additional ships, sea platforms (e.g., oil and/or gas platforms), submarines, boats, and automated sea-going devices (e.g., automated data collecting buoys or robotic boats). The air-based data collecting nodes may include aircraft, drones, airships (e.g., dirigibles or blimps, which may be automated), or weather balloons that may be equipped with weather radar systems and/or other weather sensor systems, such as infrared or microwave sensors, for example. The space-based data collecting nodes may include sub-orbital sounding rockets, weather satellites, or other types of Earth observing satellites that collect weather-related data and that may be equipped with remote weather data sensors such as infrared or microwave sensors, for example. In various examples, weather data integrating system 100 may receive weather data from various implementations of any or all of these types of data collecting nodes. In other examples, weather data integrating system 100 may collect weather data from only a subset of these example weather data collecting nodes, including only from aircraft or only from a few types of weather data collecting nodes.

Weather data integrating system 100 may be ground-based, e.g., at a centralized weather information service provider, or at an airline company operations center, in some examples. Weather data integrating system 100 may receive weather data from aircraft 10 and 20 and ground-based weather radar system 180, and potentially from one or more additional data collecting nodes 140, via telecommunication satellite 30. Processors 102 and memory 104 of weather data integrating system 100 may integrate the weather data, store the integrated weather data in data storage 106, and output supplemental portions of the weather data to recipients, including aircraft 10 and 20 in this example. Example functions of weather data integrating system 100 to integrate and output the weather data are further described below.

In weather data integrating system 100, the processors 102, memory 104, data storage 106, and communication interface 108 are interconnected by communication channels 118, such as a bus or communication fabric, for transporting data and instruction code between processors 102, memory 104, and data storage 106. Processors 102 may include one or more central processing units (CPUs), one or more CPU cores, one or more graphical processing units (GPUs), or any other type of processing units. Memory 104 may include any form of working memory, such as any form of random access memory (RAM). Data storage 106 may include any form of hard disc drives, redundant array of independent discs (RAID), Flash drives, cloud storage, or any other form of data storage, and may host any form of databases, schemaless data stores, or any type of data stores. Weather data integrating system 100 may process incoming data and outgoing data via communication interface 108, which may include interface subsystems for managing data communication via both antennas 122 and telecommunication satellite 30, and via network 138.

Weather data integrating system 100 also includes a weather data integrating module 110. Weather data integrating module 110 may include an executable software application, portions of an executable software application, a library of multiple executable software applications and associated classes, methods, processes, functions, routines, or other resources, or any other body of executable software code. Weather data integrating module 110 may be stored in data storage 106 and/or loaded in memory 104 for execution by processors 102. Weather data integrating module 110 may configure processors 102 to receive incoming weather data, integrate the weather data, identify portions of the weather data that are responsive to a supplemental weather data request and/or that cover an identified region, prepare and transmit the supplemental weather data, and perform any other functions described herein. For example, weather data integrating module 110 may receive and store sets of data 166 from aircraft 10, sets of data 176 from aircraft 20, sets of data 186 from ground-based weather radar system 50, additional sets of data from any number of other data collecting nodes, and may identify, allocate, or generate data from or based on weather data sets, potentially including one or more of weather data sets 166, 176, 186, into one or more supplemental weather data sets 242 for transmission to a requesting weather radar system. This is further described below with reference to FIG. 4.

Figure 4:
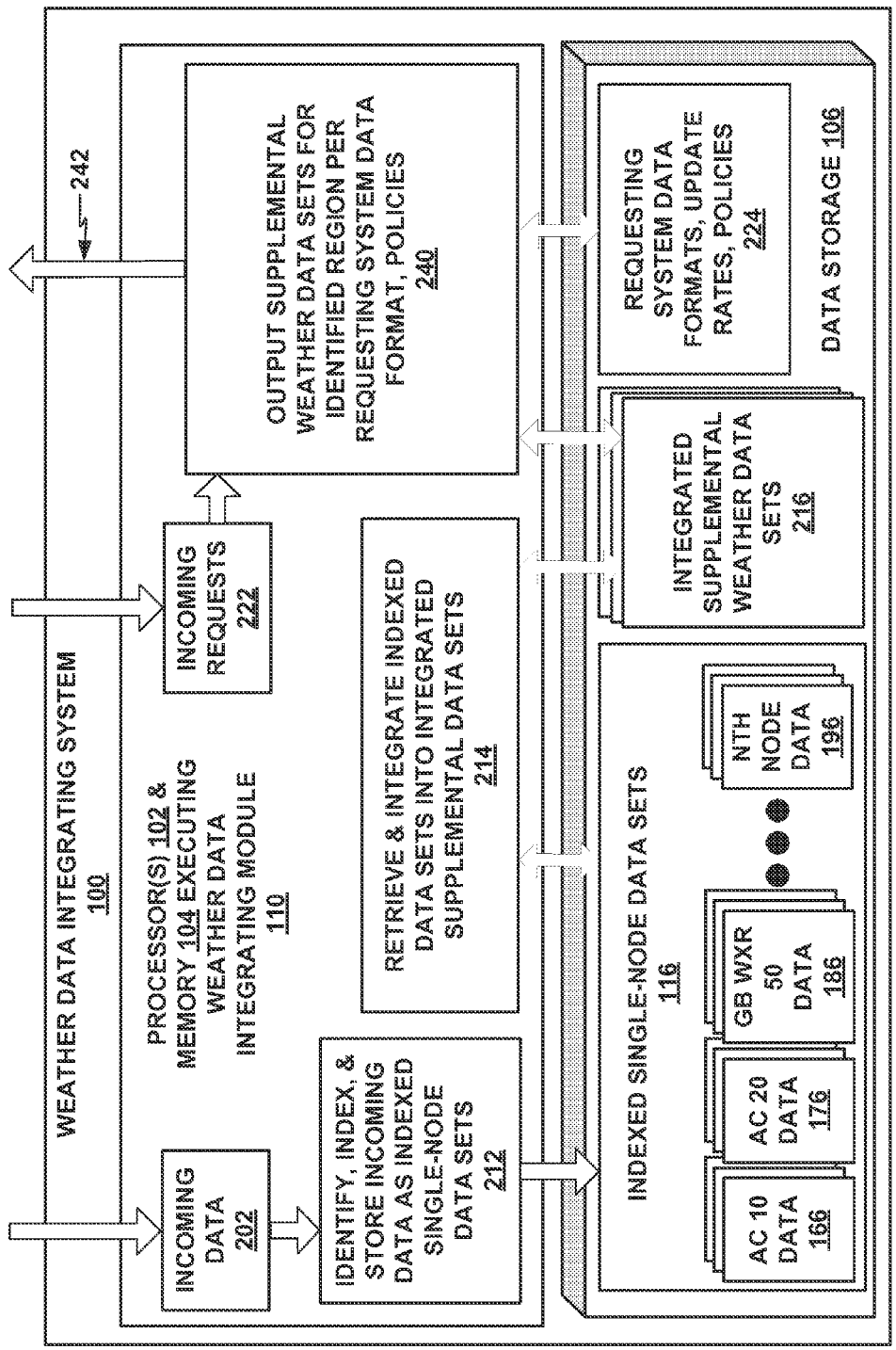
FIG. 4 depicts a conceptual block diagram of a weather data integrating system configured to receive, identify, index, and store incoming weather data; integrate the indexed weather data into integrated supplemental weather data sets; receive incoming requests for supplemental weather data covering identified regions; identify weather data corresponding to the identified regions, including weather forecast information, and in a data format corresponding to the request, or a data format associated with the weather radar system that sent the request; and output supplemental weather data to the requesting weather radar system in accordance with the request, in accordance with some examples.

FIG. 4 depicts a conceptual block diagram of a weather data integrating system 100 configured to receive, identify, index, and store incoming weather data; integrate the indexed weather data into integrated supplemental weather data sets; receive incoming requests for supplemental weather data covering identified regions; identify weather data corresponding to the identified regions, including weather forecast information, and in a data format corresponding to the request, or a data format associated with the weather radar system that sent the request; and output supplemental weather data to the requesting weather radar system in accordance with the request, in accordance with some examples. Weather data integrating system 100 includes processors 102, using memory 104, executing weather data integrating module 110. Weather data integrating system 100 further includes data storage 106.

Processors 102 may receive incoming data 202 (e.g., weather data from any of the participating weather radar data platforms 140 or other data collecting nodes 142), and execute a portion 212 of weather data integrating module 110 that configures processors 102 to identify, index, and store the incoming data as indexed single-node (e.g., from a single data collecting node) data sets, among indexed single-node data sets 116 in data stores 106. These may include sets of data 166 from aircraft 10, sets of data 176 from aircraft 20, sets of data 186 from ground-based weather radar system 50, and additional sets of data from any number of other data collecting nodes, up to sets of data 196 from an Nth data collecting node front among data collecting nodes 140, 142.

Processors 102, may execute another portion 2,14 of weather data integrating module 110 that configures processors 102 to retrieve and integrate the indexed data sets 116 into integrated supplemental weather data sets 216. Thus, in this example, weather data integrating module 110 may be configured to integrate the data asynchronously from receiving, identifying, indexing, and storing the incoming data, which may enable flexibility to take advantage of varying rates of incoming data, in some examples. In other examples, weather data integrating module 110 may integrate incoming data as it is received, without or apart from separately indexing and storing sets of weather data from individual weather data collecting nodes. In other examples, weather data integrating module 110 may receive a request for supplemental weather data for an identified region, transmit an initial supplemental data set for the identified region, and subsequently identify new incoming data for the identified region as weather data integrating system 100 receives the data, and transmit the new data for the identified region to the requesting weather radar system, with or without a step of integrating the new data with other data prior to transmission.

Processors 102 may execute another portion 240 of weather data integrating module 110 that configures processors 102 to identify, prepare, and transmit supplemental weather data sets 242 in accordance with the incoming requests 222 and with requesting system data formats and output policies 224. The requesting system data formats and output policies 224 may also be stored in data storage 106, such as in a database or other data store. The output policies 224 may include parameters for what integrated data to output in what manner, such as bandwidth requirements or limitations or data update rates for transmitting updated weather data to the requesting system. For example, weather data integrating system 100 may determine a response transmission bandwidth indicated by or as part of a particular incoming request 222 and store the indicated response transmission bandwidth in association with that particular requesting weather radar system in a policy file for that particular requesting weather radar system in output policies 224. In other examples, weather data integrating system 100 may simply respond in accordance with a response transmission bandwidth indicated by a particular incoming request 222 without storing policies associated with requesting weather radar systems. In various examples of either case, weather data integrating system 100 may then prepare and transmit the supplemental weather data for the identified region to the requesting weather radar system in accordance with the transmission bandwidth indicated by the particular incoming request 222 received from that requesting weather radar system. In some examples in which a request is not accompanied by a specified or indicated response transmission bandwidth, weather data integrating system 100 may query requesting system policies 224 and, if a policy is stored for the requesting system, apply the response transmission bandwidth indicated for the requesting weather radar data system in the policy rather than apply a default transmission bandwidth.

Processors 102 executing of weather data integrating module portion 240 may ensure that the identified supplemental weather data for the identified region is in the specific weather radar data format associated with the requesting weather radar system, such as a 3D volumetric buffer data format. Processors 102 executing of weather data integrating module portion 240 may also determine whether the existing weather data includes weather forecast information, and if needed, retrieve weather forecast information for the identified region from the available weather data, such as from the integrated supplemental weather data sets 216, and add the weather forecast information for the identified region to the supplemental weather data output sets 242. The weather forecast information may include two or more weather radar scans or other weather data sets of the identified region over a period of time, such that the multiple (two or more) weather data sets of the identified region are susceptible to showing motions and trends of weather features in the identified region, and such that those motions and trends of weather features are susceptible to extrapolation by the requesting radar system, in various examples. In some examples, processors 102 executing of weather data integrating module portion 240 may further analyze or process the multiple weather radar scans or other weather data sets over time to generate explicit indications of weather forecast information such as explicit or isolated indications of motions and trends of weather features in the identified region, ready for display or output by a requesting weather radar system.

In some examples, weather data integrating system 100 may implement any or all of its features and data management described above as being stored in data storage 106, instead completely or partially in an in-memory data store in memory 104, or in a data store that combines in-memory data in memory 104 and a data store in data storage 106. In some examples, weather data integrating system 100 may receive weather data for the identified region, and maintain the received weather data in an in-memory data store until identifying and transmitting the weather data for the identified region, such that the weather data is not stored in data storage and then retrieved from data storage in between being received, being identified as corresponding to an active request from a requesting system for weather data for an identified region, and being transmitted to that requesting system.

Weather data integrating system 100 may store and maintain transmission policies or subscription policies among requesting system data formats and policies 224, where the policies may be for applying to transmissions to requesting systems. The policies may include identifying information on subscriber accounts and their associated recipient weather radar systems, selected levels and schedules of automated data inputs from the subscriber accounts, and selected parameters to apply to the outputs for various subscriber accounts associated with requesting weather radar systems, for example. Weather data integrating module 110 may perform security, validation, and authentication functions to enable requesting weather radar systems to receive or to decode supplemental weather data outputs, in some examples.

Figure 5:
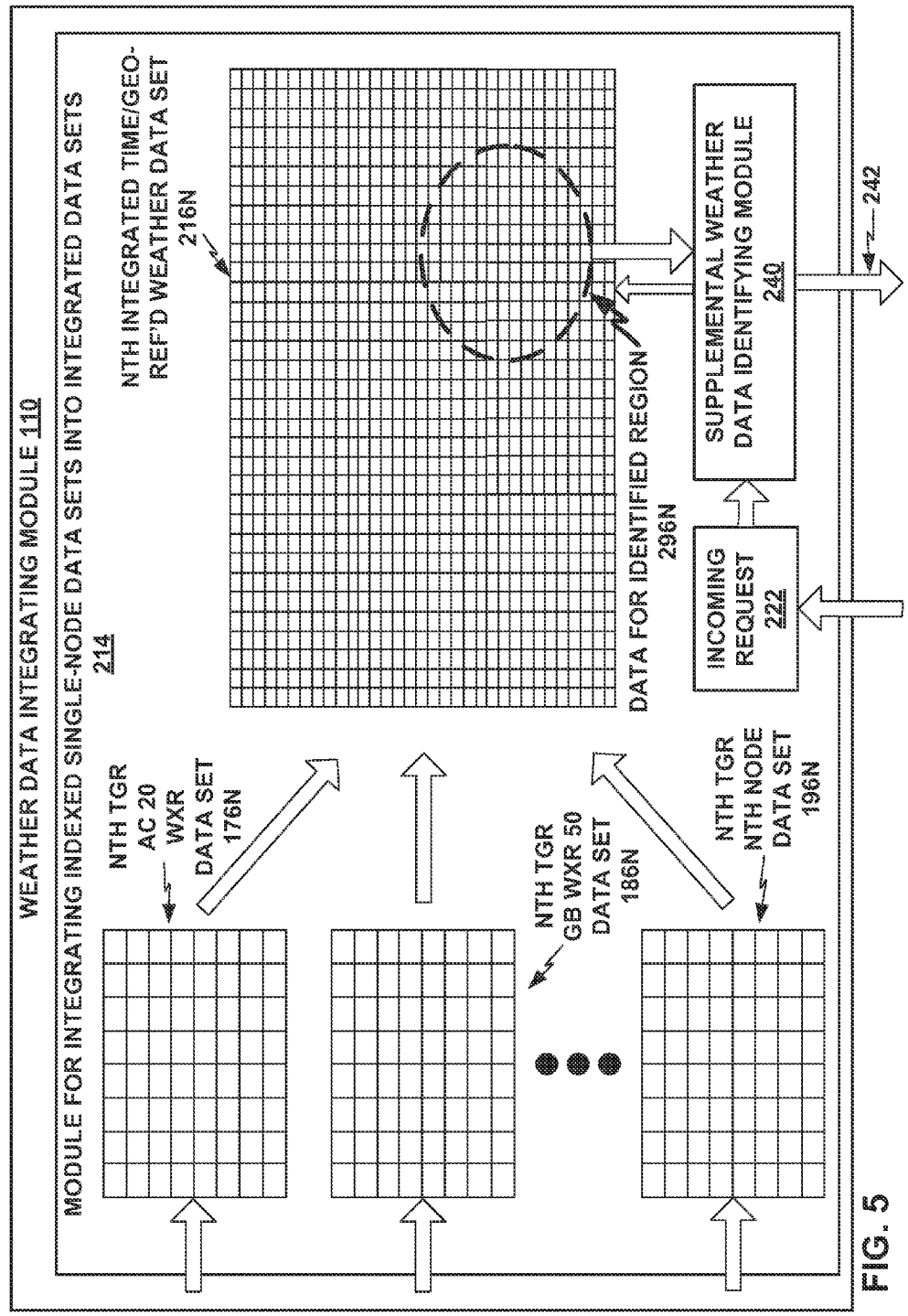
FIG. 5 depicts a conceptual diagram of a weather data integrating module that includes a module for integrating indexed single-source data sets into an integrated supplemental weather data set, in one example.

FIG. 5 depicts a conceptual diagram of a weather data integrating module 110 that includes a module 214 for integrating indexed single-source data sets 166N, 176N, 186N, . . . 196N into an integrated supplemental weather data set 216N, in one example. FIG. 5 shows an additional view of the operation of module 214 as shown in FIG. 4 for integrating weather data from multiple sources in preparation for identifying portions of weather data responsive to incoming requests for supplemental weather data sets for requesting systems, in one example.

Single-source weather data sets 176N, 186N, and 196N each includes a single set of data received from a single data source from among data collecting sources 140, including aircraft 20, ground-based weather radar system 50, and an Nth data collecting source which may be any of the data collecting sources 140 shown in FIG. 2 or described above. Accordingly, single-source data set 176N is a weather radar data set from aircraft 20, single-source data set 186N includes weather radar data from ground-based weather radar station 50, and single-source data set 196N may include weather data from another aircraft weather radar system, another ground-based weather radar system, a weather-sensing satellite, a weather-sensing drone or airship, a weather radar system or other weather sensing system from a sea-going vessel or ocean platform, or any other type of weather sensing system. Single-source data sets 176N, 186N, and 196N as shown in FIG. 5 are representative examples of weather data sets that may be collected by weather data integrating module 110 executing on weather data integrating system 100. In other examples, weather data integrating module 110 may collect data from any number of data sources, including only one or two of the examples shown in FIG. 5, or thousands or millions or any number of weather data sources.

Single-source data sets 176N, 186N, and 196N may also be time referenced and geographically referenced, such that they include identifying data or metadata matching them with certain times and geographical areas or volumes of sky of where they were collected. These time references and geographic references in the metadata of the data sets may be included by the data collecting sources in their data processing prior to transmitting their data to weather data integrating system 100. Data sets 176N, 186N, and 196N are conceptually depicted in grid form in FIG. 5 to indicate that they are Earth-referenced volumetric data sets in which the data may be implemented in the form of arrays, vectors, or other ordered form that preserves the three-dimensional Earth-referenced volumetric geographical form of the data, representing and referencing the three-dimensional geographical volume of atmosphere from which the weather data set was taken.

As part of integrating the single-source data sets, weather data integrating module 110 may match data sets from multiple weather data sources front the same point or interval in time, whether or not received asynchronously by weather data integrating system 100, and where the weather data sources were proximate to each other when the data sets were collected, such that weather data integrating module 110 is able to combine or stitch together data from multiple weather data sources covering the same or overlapping geographical areas at the same times, as in 'Nth integrated time-referenced and geographically-referenced weather data set 242N. Integrated supplemental weather data set 216N is conceptually depicted as both larger and more highly subdivided than single-source data sets 176N, 186N, 196N to represent that integrated supplemental weather data set 216N may cover a much larger geographical range and with higher resolution over at least parts of that range, by combining the weather data from the multiple data sources, where and when they overlap. Weather data integrating module 110 may thus be able to implement and output larger-range and higher-resolution weather data sets than any of the single data collecting sources are able to generate on their own.

As part of combining weather data front various sources, including from non-radar sources, weather data integrating system 100 may also receive weather data from the various weather data sources in any type of format, and may perform processing to convert or transform the weather data front those various data sources. This may include weather data integrating system 100 converting or transforming the received weather radar data in various weather radar formats or other weather data in any format, into weather radar data of the same format as the requesting weather radar system 12, such as a 3D volumetric weather radar data format. Weather data integrating system 100 may also generate weather forecast information based on any combination or all of the applicable weather data for an indicated region and time into weather forecast information in a format applicable to requesting weather radar system 12. Weather data integrating system 100 may also host more than one weather data format for requesting weather radar systems that use various data formats, and may transform incoming weather data into each of various weather radar data formats, and maintain parallel sets of weather data in each of the various weather radar data formats ready to serve to requesting weather radar data systems that may use any of the hosted weather data formats. Weather data integrating system 100 may thus be configured to transform weather data from one or more non-radar weather data sources in other data formats different from the specific weather radar format used by requesting weather radar system 12 into weather data in the specific weather radar data format associated with the requesting weather radar system 12.

Weather data integrating module 110 may thus have a large range and density of weather data front which to identify and extract weather data corresponding to an identified region indicated in an incoming request 222 from a requesting weather radar system 12, and may assemble weather data for the identified region from anywhere in its total range of data coverage, which may have originated from any one or more up to a large number of original sources of weather data. Weather data integrating module 110 may include supplemental weather data identifying module 240 (as also shown in FIG. 4), which may respond to an incoming request 222 from a requesting weather radar system 12 (such as onboard aircraft 10) by searching the available weather data of weather data integrating module 110, including representative integrated weather data set 216N, to identify weather data set 296N covering the identified region indicated in the incoming request 222.

Weather data set 296N as depicted in FIG. 5 may include one or more sets of weather radar data and/or other weather data originally from one or more weather data sources such as a weather radar system onboard aircraft 20, ground-based weather radar system 50, weather satellite 40, and so forth (e.g., additional weather data sources as depicted in FIG. 3), from one or more points in time. Supplemental weather data identifying module 240 may match the identified region indicated in the incoming request 222 with the corresponding data having geographic references and time references that weather data integrating module 110 may have indexed to facilitate identifying and extracting weather data corresponding to any arbitrarily designated volume of atmosphere, with geographic references such as a volume of air designated with reference to longitudes, latitudes, and altitudes defining the vectors, planes, or other boundaries of the identified region of air indicated in the request.

Weather data integrating module 110 may also identify and extract the weather data for that identified region of air over a span of time including the most recent available weather data set and one or more immediately preceding data sets front the recent past, such as weather data for the identified region from one or more data sources from the previous fifteen minutes or previous half-hour, for example. Weather data integrating module 110 may have also indexed the weather data with time references such as the date and time that each data set was collected. Weather data integrating module 110 may identify weather data 296N from the designated volume of air of the identified region indicated by the request from each of two or more points in time and from one or more data sources, and include those multiple sets of weather data in the supplemental weather transmission as weather forecast information. The weather forecast information comprising the two or more weather data sets over time from one or more weather data sources may include data on motions or trends of weather features such as convective weather cells in the identified region, if any.

The motion and/or trend data of weather features in the identified region may enable extrapolation or forecasting of the weather features into the near future, such as for the subsequent fifteen minutes or half-hour, for example, or otherwise during a period of time in which the weather forecast information may relevant to the flight of the aircraft hosting the requesting weather radar system.

The requesting weather radar system may be enabled to perform future weather forecasting over such a period of time based on the weather forecast information included in the supplemental weather data transmitted by the weather data integrating system 100, in some examples. Weather data integrating system 100 may also process the weather data sets to perform its own forecasting or generate its own weather forecast information based on the incoming weather data sets, and transmit its processed weather information as part of the supplemental weather data it transmits to a requesting system 12, in some examples. For example, weather data integrating system 100 may analyze incoming weather data front several different weather data sources that all track a single convective weather cell with a position, a horizontal motion of direction, a vertical component of motion, if any, and a trend of vertical growth, and weather data integrating system 100 may concentrate such data from the several different weather data sources to provide a single description of the identified region including a single description of the identified convective weather cell in the identified region, including its position, direction of motion, and trend of vertical growth, with a resolution that combines or integrates the data from all the applicable various weather data sources. Weather data integrating system 100 may, by concentrating information in this way, transmit effectively the same amount of useful information to the requesting system 12 with significantly lower bandwidth, in some examples.

Weather data integrating system 100 and/or the requesting system 12 may generate a weather forecast based on the weather forecast information for the identified region based on a simple, first-order extrapolation of motions and trends of weather features such as convective weather cells in the identified region. Such a simple, first-order extrapolation of motions and trends of weather features may be based on the assumption that a weather feature will continue motion at the same speed and heading as it did in two or more existing, recent points in time, and continue a growth trend (e.g., growing vertically to a higher altitude) at a same rate as it did in two or more existing, recent points in time. Weather data integrating system 100 may, for example, determine and generate an extrapolation or forecast of horizontal motion, vertical growth and/or vertical motion, and/or reflectivity trend of each of one or more convective weather cells. Weather data integrating system 100 may parameterize the horizontal motion of a convective weather cell in terms of east-west and north-south horizontal motion components or radial and tangential horizontal motion components relative to the current or predicted position of requesting system 12, e.g., onboard its aircraft. Requesting system 12 may receive and use the horizontal motion data provided by weather data integrating system 100 as parameterized in the appropriate weather radar data format. Weather data integrating system 100 may also include, in its weather forecast information sent to requesting system 12, reflectivity trends in convective weather cells over time, which may be indicative of whether convective weather cells are dissipating or growing larger and stronger.

Weather data integrating system 100 and/or the requesting system 12 may generate a weather forecast based on the weather forecast information for the identified region based on more advanced techniques than simple first-order extrapolation, in some examples. However, it has been shown that for forecasting for only short periods of time such as fifteen minutes, a half-hour, or other forecasting period applicable to proximate weather forecasting for an aircraft in flight, a simple, first-order approximation performs similarly to more complex analyses, such that the accuracy of the forecast over such as short period of time is similar to forecasts generated using more complex and more advanced techniques. On the other hand, more complex forecasting techniques may provide significant advantage in accuracy only further out into the future than a time period on the order of fifteen minutes or a half-hour, which may be the applicable range of an update rate for updates from weather data integrating system 100.

Weather data integrating system 100 may thus in some examples be configured to transmit the supplemental weather data at a different (e.g., lower) transmission update rate than a specific weather radar data update rate associated with the requesting weather radar system 12, where the supplemental weather data, including its weather forecast information, may be used by a supplemental weather radar data receiving subsystem of the requesting weather radar system 12 to supplement the weather radar scan data generated by the requesting weather radar system 12 and to extrapolate the supplemental weather radar data over time. Requesting weather radar system 12 may receive the supplemental weather radar data from weather data integrating system 100 asynchronously with receiving its own weather radar scan data. Requesting weather radar system 12 may identify portions of the buffer cells of its 3D volumetric buffer memory component that correspond with the identified obscured region, which are not receiving data from the own weather radar scan of the requesting weather radar system 12, and load data from the supplemental weather data from weather data integrating system 100, where the data is already in the 3D volumetric buffer format, into the portion of the buffer cells of the 3D volumetric radar system buffer memory component that are assigned to hold data on the 3D volume of the identified region at a time of a specific active radar scan.

Additionally, requesting weather radar system 12 may use a single set of supplemental weather data from weather data integrating system 100, including the weather forecast information, to generate extrapolated, forecasted weather data on the identified region and load the extrapolated, forecasted weather data for the identified obscured region into portions of the buffer cells of the radar system buffer memory component that are assigned to hold data on the 3D volume of the identified obscured region at two or more iterations over time of own system active radar scans by the requesting weather radar system 12. Other subsystems of requesting weather radar system 12 or other systems of the own aircraft may then receive the 3D volumetric radar buffer memory data from the radar system 3D volumetric buffer memory and use the 3D volumetric radar buffer memory data for other purposes, such as performing advanced algorithms for detection of turbulence, icing, and wind shear, as if the 3D volumetric radar buffer memory data had all been natively generated by the own weather radar scan data of the requesting weather radar system 12. In other words, other aircraft systems may use the combined natively generated weather radar data from the onboard weather radar and supplemental weather radar data seamlessly incorporated into the natively generated weather radar data, such that other aircraft systems without modification can benefit from the supplemental weather radar data.

In some examples, weather data integrating system 100 may identify when only a single data set from a reporting weather data source is applicable to an identified region indicated by a requesting system 12, and weather data integrating system 100 may query one or more applicable weather data collecting sources identified as providing coverage of the identified area, to provide at least a second weather data set at a new or different point in time, so that weather data integrating system 100 can have data covering the identified region over multiple points in time, to constitute or to serve as the basis of weather forecast information for the identified region to transmit to the requesting system 12. Whether or not any other aircraft in flight happen to be able to provide weather radar coverage of the identified region at that given point in time, weather data integrating system 100 may be able to query a ground-based weather radar system 50, a weather satellite 40 (or ground-based receiving system of data from weather satellite 40), or another weather data source that may be known to weather data integrating system 100 as providing permanent coverage of a given identified region. Weather data integrating system 100 may also query an aircraft in flight that may be known or predicted to provide weather radar coverage of the identified region, either concurrently or soon after the query from weather data integrating system 100.

In some examples, weather data integrating system 100 may also perform canceling of ground surface feature reflections front its weather radar data, prior to transmitting the supplemental weather data to the requesting system 12. For example, weather data integrating system 100 may have access to a global database or other data store of ground surface physical geography for the ground surface of the Earth or substantial areas thereof. Weather data integrating system 100 may then compare weather radar components of the weather data received from the weather data sources with the data store of ground surface physical geography, and cancel radar reflection data from ground surfaces front the weather radar components of the received weather data, based at least in part on the comparing of the one or more weather radar components of the received weather data with the data store of ground surface physical geography, prior to transmitting the supplemental weather data for the identified region to the requesting system. That is, portions of received weather radar data from one or more weather radar data sources may be due to radar reflections from ground surfaces rather than from weather features, and comparison of the weather radar data with the ground surface geography data store by weather data integrating system 100 may enable weather data integrating system 100 to cancel out this ground surface data as part of its process of preparing the supplemental weather data covering the identified region, prior to weather data integrating system 100 transmitting the supplemental weather data to the requesting system 12, to keep the data focused on weather features.

Figure 6:
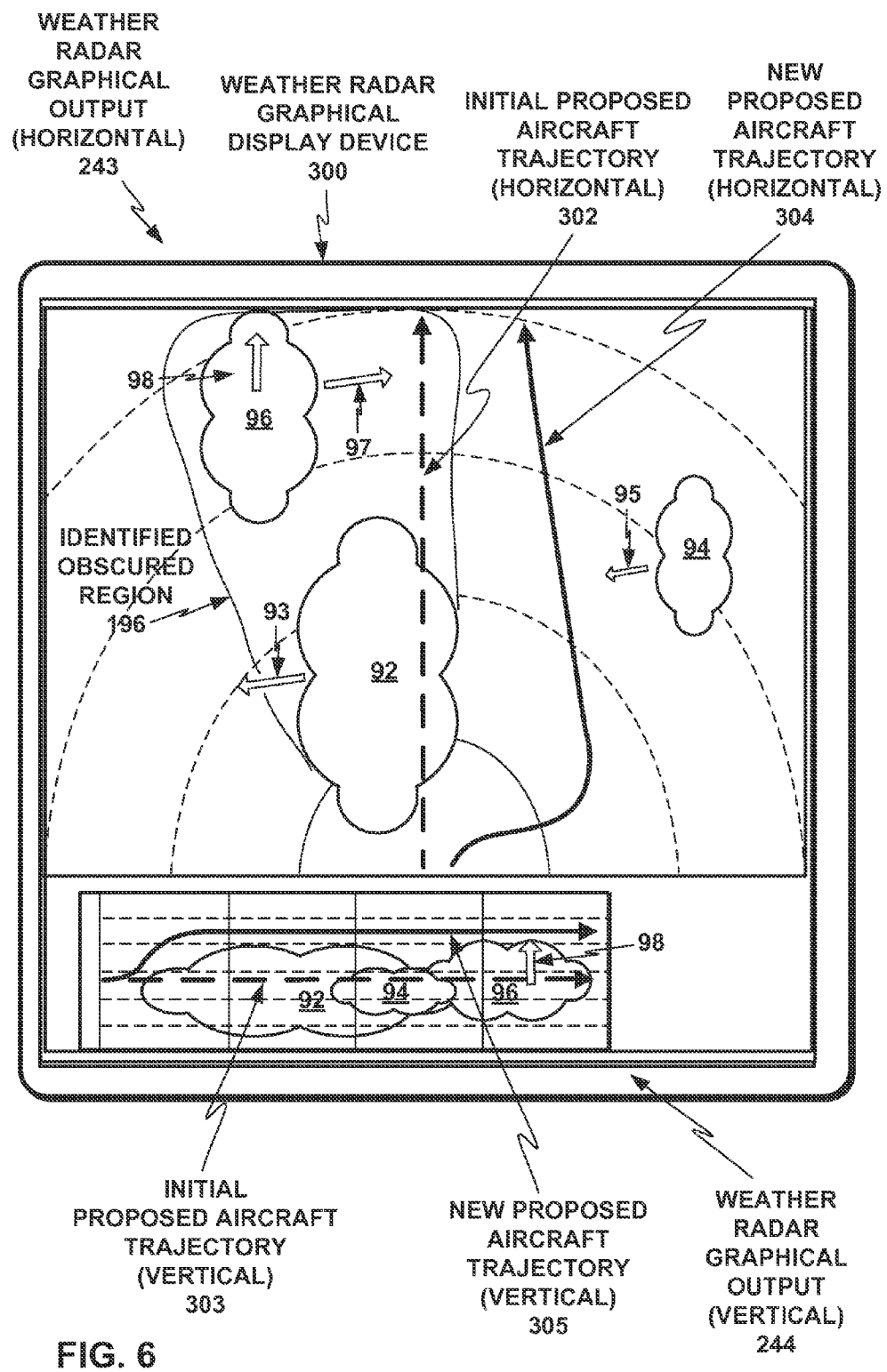
FIG. 6 shows a conceptual diagram of a weather radar graphical display device of requesting weather radar system onboard aircraft, displaying a graphical output based on both its own weather radar reception and on a supplemental weather data output generated and transmitted to a requesting weather radar system by a weather data integrating system, in one example.

FIG. 6 shows a conceptual diagram of a weather radar graphical display device 300 of requesting weather radar system 12 onboard aircraft 10, displaying a graphical output 243, 244 based on both its own weather radar reception and on supplemental weather data output 242. generated and transmitted to requesting weather radar system 12 by weather data integrating system 100, in one example. Graphical output 243, 244 includes a horizontal graphical output 243 and a vertical graphical output 244 both based on the same combination of the own weather radar reception and on supplemental weather data set 242 received from weather data integrating system 100. Supplemental weather data set 242 may be in the same data format as the normal data format used by own weather radar system 12 and weather radar graphical display device 300. This data format frilly be a three-dimensional (3D) volumetric buffer data set, which may also be time-ordered, and include sets of 3D volumetric buffer data time-stamped with different times of data collection. The 3D volumetric buffer data format may enable the flight crew to view arbitrarily selected two-dimensional slices of data from a given time, such as corresponding to horizontal two-dimensional slices of weather radar display at different altitudes, and may enable panning through different successive altitudes to get a better sense of the 3D shape of weather features and how the weather features might affect the flight path of own aircraft 10 at different altitudes.

The 3D volumetric buffer data for the supplemental weather data set received from weather data integrating system 100 may cover an area of sky corresponding to the identified obscured region 196 behind and radar-obscured by convective weather cell 92, and including recent changes Over time in the applicable or selected three-dimensional volume of space, from data collected at two or more points in time, such that the time-ordered weather data forms weather forecast information, by being susceptible to using for weather forecasting and/or by being concentrated into a pre-processed weather forecast by weather data integrating system 100. By receiving the supplemental weather data in the same data format as natively used by own weather radar system 12, own weather radar system 12 and weather radar graphical display device 300 may easily and seamlessly incorporate the supplemental weather data and the display thereof into the natively generated weather radar display of weather radar graphical display device 300 based on the weather radar signals generated and received by own weather radar system 12. In examples in which the weather data has already been processed to generate a weather forecast, the weather forecast information may be included as vectors or other representations of motion or trend data, for weather features such as convective weather cells, accompanying other weather data such as reflectivity values for each positional unit or effective pixel of a three-dimensional representation of the volume of space.

In the example of FIG. 6, horizontal and vertical graphical outputs 243, 244 may show volumes of clear weather, volumes of light precipitation, volumes of convective weather, and volumes of highly convective weather corresponding to full radar reflectivity and radar gain saturation. This view is simplified in the depiction of FIG. 6 such that weather radar graphical display 300 may show, based on data from the own radar reception of weather radar system 12, convective weather cells 92 and 94 as fully radar-reflective or fully saturated areas, indicating severe convective weather cells. Weather radar graphical display 300 may show convective weather cells 92 and 94 in a color display in solid magenta, in one example implementation. In such an example implementation, weather radar graphical display 300 may show other surrounding areas in red, green, and black indicating volumes of lesser convective weather, volumes of light precipitation, and volumes of clear weather, respectively, where it may be understood that such display elements are omitted from the depiction of FIG. 6 for the purpose of clarity. Weather radar graphical display 300 also shows highly convective weather cell 96 within the identified obscured region 196 based on the supplemental weather data received by weather radar system 12 from weather data integrating system 100, where weather radar graphical display 300 would otherwise not have had any data for identified obscured region 196, in this example.

Weather radar graphical display 300 may also show highly convective weather cell 96 in solid magenta, in common with highly convective weather cells 92 and 94, in one example implementation. Weather radar graphical display device 300 may also show highly convective weather cell 96 with some other distinctive imagery, such as near-solid magenta with some modifying visual aspect (e.g., white stripes or pink dots), to visually indicate to the flight crew that this feature of the weather radar display output is based on an outside source—the supplemental data from weather data integrating system 100—as opposed to being based on the own native radar reception of onboard weather radar system 12.

Weather radar graphical display 300 may also show simple visual indications of the weather forecast information for identified obscured region 196 received as part of the supplemental weather data set, as well as weather forecast information for the display portions based on the own weather radar data generated by onboard weather radar system 12. The visual indications of the weather forecast information for identified obscured region 196 displayed by weather radar graphical display device 300 based on the forecast information from the supplemental weather set may include motion vector 97 and altitude growth trend vector 98 for convective weather cell 96, both of which may be shown in either or both of the horizontal and vertical display portions 243, 244. Weather radar graphical display 300 may also show weather forecast information based on the own weather radar data collection of onboard weather radar system 12, such as motion vectors 93, 95 for convective weather cells 92, 94 respectively.

The weather forecast information included in the supplemental weather data set by weather data integrating system 100 may enable own aircraft weather radar system 12 and weather radar graphical display 300 to extrapolate and synchronize the update rate of the supplemental weather data set at the same update rate as that of the weather radar scanning and natively generated weather radar update rate of own aircraft weather radar system 12 and weather radar graphical display 300, regardless of the actual rate at which own aircraft weather radar system 12 receives the supplemental weather data. Own aircraft weather radar system 12 may be enabled to perform a simple, fast-order extrapolation, or other type of forecast, of the weather features in the identified obscured region, to generate updates at the same rate at which weather radar system 12 natively updates its own weather radar display based on its rate of radar scanning This synchronization of the updates of the entire weather radar display outputs on weather radar graphical display 300 may contribute to a sense of seamless incorporation of the own weather radar information generated natively by own aircraft weather radar system 12 and the supplemental weather radar data provided by weather data integrating system 100.

Weather radar graphical display device 300 may also show currently suggested trajectories including heading and altitude for the own aircraft 10. Prior to receiving the supplemental weather data from weather data integrating system 100, aircraft 10 may be on a trajectory represented by horizontal trajectory component 302 and vertical trajectory component 303 shown in horizontal and vertical radar display portions 243, 244, respectively. Another onboard aircraft system such as a flight management system (EMS) (not shown in FIG. 6) may predict or track a planned trajectory for aircraft 10, may output the information on that planned trajectory to radar display device 300, and may process weather radar data from onboard weather radar system 12 in confirming the trajectory or evaluating whether to suggest changes to the trajectory. The EMS or some other combination of the EMS and the own aircraft onboard weather radar system may prepare and transmit requests to the weather data integrating system 100 and may be considered to be the "requesting system" for purposes of this disclosure.

The FMS may initially receive data on convective weather cells 92 and 94, and their positions, horizontal extent, horizontal motions, vertical extern, and vertical growth, and may evaluate that the planned trajectory for aircraft 10 is projected to pass in between the convective weather cells 92 and 94 at the positions those cells will occupy at the time of closest approach, such that no change in trajectory is recommended. However, after onboard weather radar system 12 receives the supplemental weather data from weather data integrating system 100 and reveals convective weather cell 96, the EMS may determine that convective weather cell 96 as revealed by the supplemental data from weather data integrating system 100 is on an intercept course with the pre-existing planned trajectory of own aircraft 10, and also shows a vertical growth trend projected to extend over an increasing difference in altitude above the pre-existing flight altitude of own aircraft 10.

The FMS may thus determine and project onto weather radar display device 300 a new recommended trajectory 304, 305 (horizontal and vertical components, respectively) on which the own aircraft 10 would alter heading and climb to a higher altitude, which would enable keeping to volumes of clear weather rather than flying into the turbulence of convective weather cell 96 previously hidden by convective weather cell 92. The supplemental weather data supplied to own aircraft weather radar system 12 by weather data integrating system 100 may thus enable the flight crew of own aircraft 10 to better navigate around convective weather and to better remain in volumes of clear weather.

Figure 7:
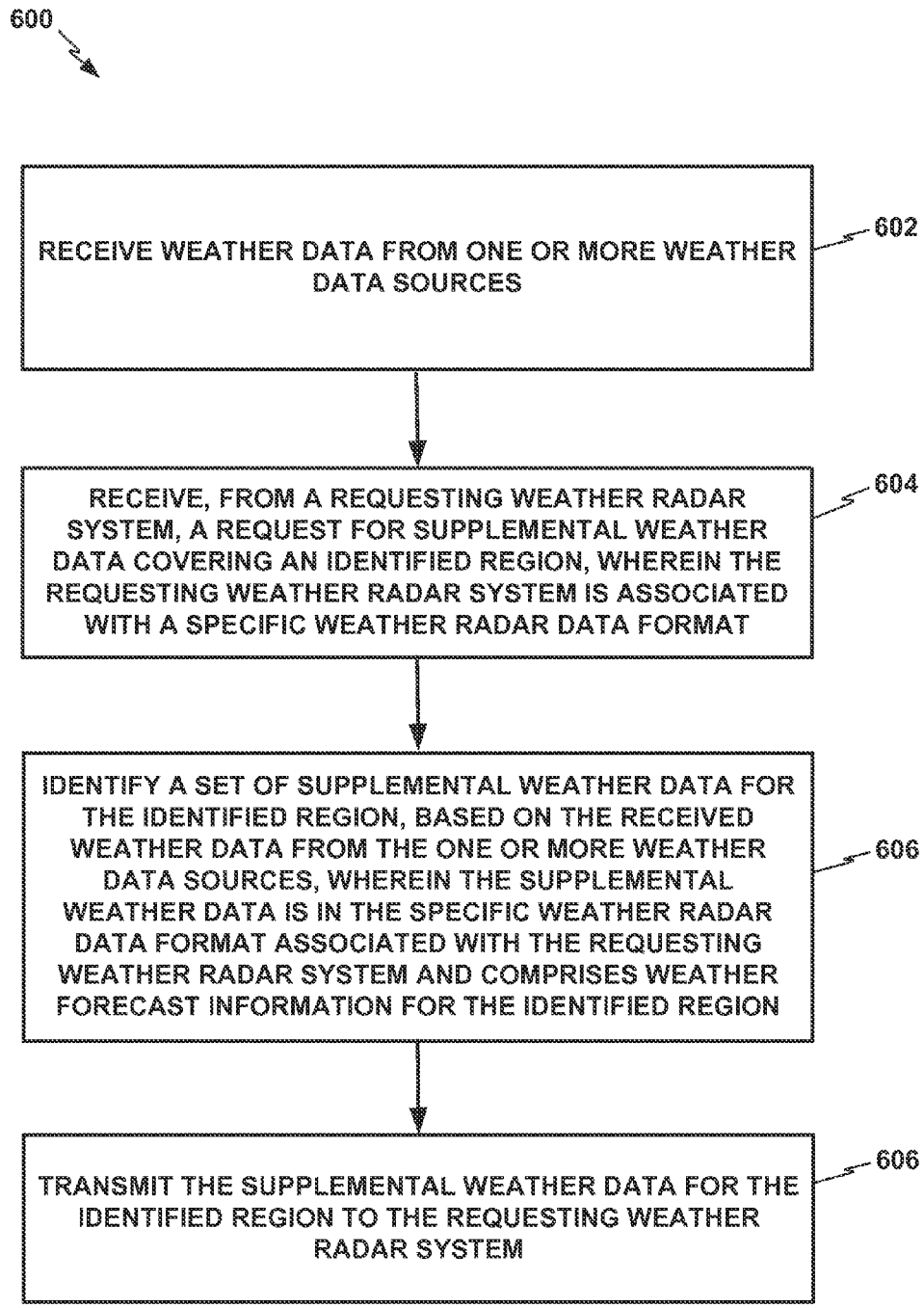
FIG. 7 shows a flowchart for an example method for integrating and outputting a supplemental weather data set, as may be implemented, performed, executed, and/or embodied by a weather data integrating system in various examples of this disclosure.

FIG. 7 shows a flowchart for an example method 600 for integrating and outputting a supplemental weather data set, as may be implemented, performed, executed, and/or embodied by a weather data integrating system in various examples of this disclosure. Method 600 includes receiving weather data from one or more weather data sources (e.g., weather data integrating system 100 receiving, via telecom sat 30, one or more sets of weather data from aircraft 10, 20 or other data collecting sources among data collecting sources 50, 40, 142) (602). Method 600 further includes receiving, from a requesting weather radar system, a request for supplemental weather data covering an identified region, wherein the requesting weather radar system is associated with a specific weather radar data format (e.g., weather data integrating system 100 receiving a request front weather radar system 12 onboard own aircraft 10 for data on an identified obscured region 196 behind convective weather cell 92) (604).

Method 600 further includes identifying a set of supplemental weather data for the identified region, based on the received weather data from the one or more weather data sources, wherein the supplemental weather data is in the specific weather radar data format associated with the requesting weather radar system and comprises weather forecast information for the identified region (e.g., weather data integrating system 100, or portions/modules 110, 214, 240 of weather data integrating system 100, identifying supplemental weather data 296N covering the identified region) (606). Method 600 further includes transmitting the supplemental weather data for the identified region to the requesting weather radar system (e.g., weather data integrating system 100 transmitting supplemental weather radar data set 296N, 242, to weather radar system 12, and graphical display device 300 associated with or included in weather radar system 12 or onboard aircraft 10) (608).

Figure 8:
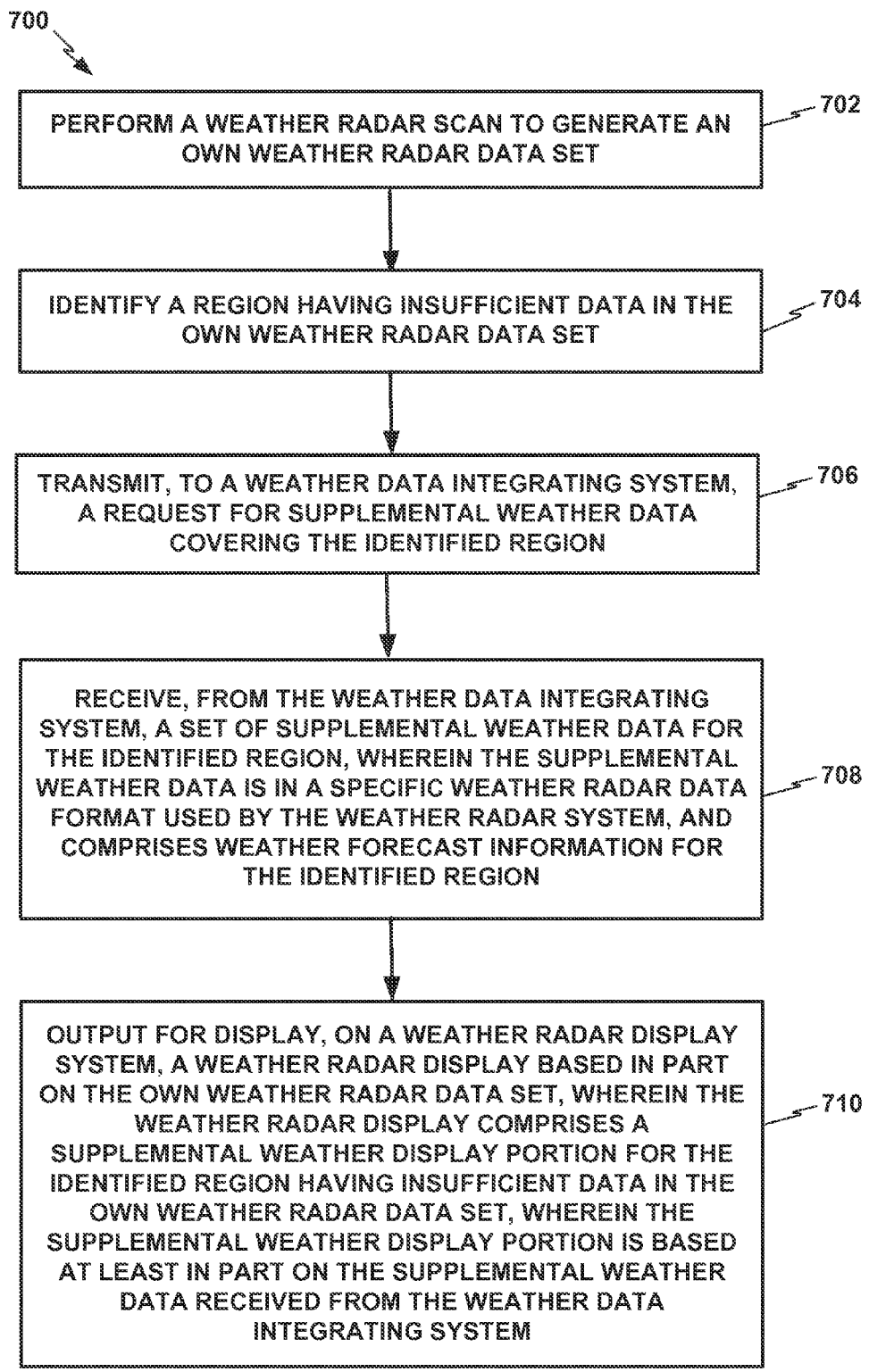
FIG. 8 shows a flowchart for an example method of requesting and receiving a supplemental weather data set by an onboard weather radar system, as may be implemented, performed, executed, and/or embodied by an onboard weather radar system onboard an aircraft in flight in various examples of this disclosure.

FIG. 8 shows a flowchart for an example method 700 of requesting and receiving a supplemental weather data set by an onboard weather radar system, as may be implemented, performed, executed, and/or embodied by an onboard weather radar system onboard an aircraft in flight in various examples of this disclosure. Method 700 includes performing a weather radar scan to generate an own weather radar data set (e.g., weather radar system 12 onboard own aircraft 10 performing a weather radar scan) (702). Method 700 further includes identifying a region having insufficient data in the own weather radar data set (e.g., weather radar system 12 identifying an obscured region 196 of low or no data behind convective weather cell 92 in a set of weather radar data generated by the reception of its own reflected weather radar signals from own aircraft 10, where the radar signal reflections from convective weather cell 92 are of sufficient strength to saturate the gain of the receiver subsystem of weather radar system 12 onboard aircraft 10) (704). Method 700 further includes transmitting, to a weather data integrating system, a request for supplemental weather data covering the identified region (e.g., weather radar system 12 onboard aircraft 10 transmitting a request to weather data integrating system 100, via datalink communication channels such as those provided by telecommunication satellite 30, for supplemental weather data covering the identified region 196, where the request may include parameters identifying the volume of airspace obscured by the saturated gain front the high radar reflection of convective weather cell 92) (706).

Method 700 further includes receiving, from the weather data integrating system, a. set of supplemental weather data for the identified region, wherein the supplemental weather data is in a specific weather radar data format used by the weather radar system, and comprises weather forecast information for the identified region (e.g., weather radar system 12 onboard aircraft 10 receiving, from weather data integrating system 100, a supplemental weather data set output 242 including supplemental weather data set 296N covering identified obscured region 196) (708). Method 700 further includes outputting for display, on a weather radar display system, a weather radar display based in part on the own weather radar data set, wherein time weather radar display comprises a supplemental weather display portion for the identified region having insufficient data in the own weather radar data set, wherein the supplemental weather display portion is based at least in part on the supplemental weather data received from the weather data integrating system (e.g., weather radar system 12, and graphical weather display device 300 thereof, onboard aircraft 10, outputting for display, graphical display outputs both based on natively generated weather radar data from weather radar system 12 based on its own reception of its own previously transmitted weather radar signals, and based on the supplemental weather data set output 242 including supplemental weather data set 296N covering identified obscured region 196 as received from weather data integrating system 100, and showing weather features in the identified obscured region 196 such as convective weather cell 96 and indications of the motion 97 and altitude growth trend vector 98 thereof) (710).

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of weather data integrating system 100 and/or processors 102 thereof, and/or system elements for executing and/or storing weather data integrating module 110 or features thereof as disclosed above, may be implemented in any of a variety of types of solid state circuit elements, such as CPUs, CPU cores, GPUs, digital signal processors (DSPs), application-specific integrated circuits (ASICs), a magnetic nonvolatile RAM or other types of memory, a mixed-signal integrated circuit, a field programmable gate array (FPGA), a microcontroller, a programmable logic controller (PLC), a programmable logic device (PLD), a complex programmable logic device (CPLD), a system on a chip (SoC), a. subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed herein to weather data integrating module 110.

Elements of weather data integrating module 110 may be programmed with various forms of software. Weather data integrating module 110 may be implemented at least in part as, or include, one or more executable applications, application modules, libraries, classes, methods, objects, routines, subroutines, firmware, and/or embedded code, for example. Elements of weather data integrating module 110 as in any of the examples herein may be implemented as a device, a system, an apparatus, and may embody or implement a method of integrating and outputting environmental condition data, including for implementing example method 600 as described with reference to FIG. 11.

The techniques of this disclosure may be implemented in a wide variety of computing devices. Any components, modules Of units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

An "aircraft" as described and claimed herein may include any fixed-wing Of rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft). While some examples are described in terms of weather data integrating system 100 transmitting supplemental weather data for an identified region to a requesting weather radar system 12 and requesting weather radar system 12 outputting a supplemental weather display portion for the identified region, in other examples, weather data integrating system 100 may communicate integrated weather data outputs to any system, component, device, software module, computer, or other feature, and/or requesting weather radar system 12 may use the supplemental weather data for the identified region for other purposes such as navigation without generating a graphical display based on the supplemental weather data. For example, an aircraft may have an automated navigation system that may work with or incorporate the requesting weather radar system and may use the supplemental weather data to perform automated navigation, in these examples, weather data integrating system 100 may transmit supplemental weather data outputs that may enable an automatic software-based navigation and/or piloting system to make navigation decisions based on accurate, wide-ranging, up-to-date, and high-resolution characterization of weather in regions obscured to the own weather radar system and/or other weather detecting system available to the automatic software-based navigation and/or piloting system onboard an aircraft.

Various illustrative aspects of the disclosure are described above. These and other aspects are within the scope of the following claims.

What is claimed is:

1. A system comprising:
   a memory; and
   one or more processors configured to:
   receive weather data from one or more weather data sources;
   receive, from a requesting weather radar system, a request for supplemental weather data covering an identified region, wherein the requesting weather radar system is associated with a specific weather radar data format;
   identify a set of supplemental weather data for the identified region, based on the received weather data from the one or more weather data sources, wherein the set of supplemental weather data for the identified region is in the specific weather radar data format associated with the requesting weather radar system and comprises weather forecast information for the identified region; and
   transmit the set of supplemental weather data for the identified region to the requesting weather radar system.

2. The system of claim 1, wherein the one or more processors are further configured to identify the set of supplemental weather data for the identified region such that the weather forecast information for the identified region comprises data on one or more of: horizontal motion of one or more weather features in the identified region; vertical growth of the one or more weather features in the identified region; and reflectivity trend of the one or more weather features in the identified region.

3. The system of claim 1, wherein the one or more processors are further configured to transmit the set of supplemental weather data for the identified region at a lower transmission update rate than a specific weather radar data update rate associated with the requesting weather radar system, wherein the specific weather radar data update rate comprises a rate at which the requesting radar system performs an active radar scan and loads data resulting from the active radar scan into buffer cells of a radar system three-dimensional (3D) volumetric buffer memory component, such that the weather forecast information for the identified region is sufficient to be extrapolated by the requesting weather radar system at the specific weather radar data update rate and loaded into a portion of the buffer cells of the radar system 3D volumetric buffer memory component that are assigned to hold data on a 3D volume of the identified region at a time of a specific active radar scan.

4. The system of claim I, wherein the specific weather radar data format comprises a three-dimensional (3D) volumetric buffer weather radar data format with time references and three-dimensional geographic references associated with the weather data.

5. The system of claim 1, wherein the one or more weather data sources comprise two or more weather data sources, and wherein the one or more processors are further configured such that identifying the set of supplemental weather data for the identified region comprises integrating the weather data received from the two or more weather data sources into a single integrated set of weather data in the specific weather radar data format associated with the requesting weather radar system.

6. The system of claim 1, wherein the weather data from the one or more weather data sources comprises weather data from one or more non-radar weather data sources, and wherein the processors are further configured to transform the weather data from the one or more non-radar weather data sources in a second data format different from the specific weather radar format into weather data in the specific weather radar data format associated with the requesting weather radar system.

7. The system of claim I, wherein the weather data from the one or more weather data sources comprises weather radar data from one or more weather radar data sources having a different weather radar data format than the specific weather radar data format associated with the requesting weather radar system, and wherein the processors are further configured lo transform the weather radar data from the one or more weather radar data sources into weather data in the specific weather radar data format associated with the requesting weather radar system.

8. The system of claim I, wherein the one or more processors are further configured to:
   determine a response transmission bandwidth indicated by the request; and
   prepare and transmit the set of supplemental weather data for the identified region to the requesting weather radar system in accordance with the transmission bandwidth indicated by the request.

9. The system of claim 1, wherein the one or more processors are further configured to:
   determine whether the request indicates an option for a fixed-time uplink or an option for a request-response uplink; and
   identify the set of supplemental weather data for the identified region and transmit the set of supplemental weather data for the identified region to the requesting weather radar system either for a fixed time in response to determining that the request indicates the option for the fixed-time uplink, or as a single transmission in response to determining that the request indicates the option for the request-response uplink.

10. The system of claim 1, wherein the one Of more processors are further configured to:
    in response to receiving the request from the requesting weather radar system, send a request to the one or more weather data sources for extra data covering the identified region;

receive the extra data covering the identified region from the one or more weal data sources; and transmit the extra data covering the identified region to the requesting weather radar system.

11. The system of claim 1, wherein the one or more processors are further configured to apply data compression to the set of supplemental weather data for the identified region prior to transmitting the set of supplemental weather data for the identified region to the requesting weather radar system.

12. The system of claim 1, wherein the one or more processors are further configured to include indications of one or More of hail, lightning, turbulence, and wind shear in the set of supplemental weather data for the identified region.

13. The system of claim 1, wherein the one or more processors are further configured to:

compare one or more weather radar components of the received weather data from the one or more weather data sources with a data store of ground surface physical geography; and cancel radar reflection data from ground surfaces from the one or more weather radar components of the received weather data, based at least in part on the comparing of the one or more weather radar components of the received weather data with the data store of ground surface physical geography, prior to transmitting the set of supplemental weather data for the identified region to the requesting system.

14. The system of claim 1, wherein the one or more processors are further configured to:

store an indication associated with the requesting weather radar system of the specific weather radar data format associated with the requesting weather radar system, prior to receiving the request from the requesting system;

identify the specific weather radar data format associated with the requesting weather radar system, in response to receiving the request from the requesting weather radar system; and ensure that the set of supplemental weather data for the identified region is in the specific weather radar data format associated with the requesting weather radar system in accordance with the stored indication, prior to transmitting the set of supplemental weather data for the identified region to the requesting weather radar system.

15. The system of claim 1, further comprising a communications interface subsystem configured to receive the weather data from the one or more weather data sources via both one or more radio antennas and one or more network connections, and to transmit the set of supplemental weather data for the identified region to the requesting weather radar system via the one or more radio antennas.

16. A weather radar system comprising:

a memory; and one or more processors configured to:

perform a weather radar scan to generate an own weather radar data set;

identify a region having insufficient data in the own weather radar data set;

transmit, to a weather data integrating system, a request for supplemental weather data covering an identified region;

receive, from the weather data integrating system, a set of supplemental weather data for the identified region, wherein the set of supplemental weather data for the identified region is in a specific weather radar data format used by the weather radar system, and comprises weather forecast information for the identified region; and output for display, on a weather radar display system, a weather radar display based in part on the own weather radar data set, wherein the weather radar display comprises a supplemental weather display portion for the identified region having insufficient data in the own weather radar data set, wherein the supplemental weather display portion is based at least in part on the set of supplemental weather data for the identified region received from the weather data integrating system.

17. The weather radar system of claim 16, wherein the weather radar system is further configured such that identifying the region as having insufficient data in the own weather radar data set comprises identifying a region obscured by a weather cell sufficiently reflective to attenuate radar coverage of the obscured region below a nominal signal-to-noise (SNR) threshold.

18. The weather radar system of claim 16, wherein the specific weather radar data format of the own weather radar system comprises a three-dimensional (3D) volumetric weather radar data format with time references and three-dimensional geographic references associated with the own weather radar data set.

19. The weather radar system of claim 16, wherein the one or more processors are further configured to update the supplemental weather display portion for the identified region, based on the weather forecast information for the identified region received from the weather data integrating system, at a specific weather radar update rate of the weather radar system.

20. The weather radar system of claim 19, wherein the specific weather radar data update rate used by the weather radar system comprises a rate in a range of once per fifteen seconds to once per thirty-five seconds.

21. The weather radar system of claim 16, wherein the weather forecast information for the identified region comprises data on one or more of: tangential motion of one or more weather features in the identified region; radial motion of the one or more weather features in the identified region; vertical growth of the one or more weather features in the identified region; and reflectivity trend of the one or more weather features in the identified region, and wherein the one or more processors are further configured to perform extrapolation of the weather forecast information for the identified region to update the supplemental weather display portion for the identified region at a specific weather radar update rate of the weather radar system.

22. The weather radar system of claim 16, wherein the one or more processors are further configured to:

indicate a response transmission bandwidth with the request for supplemental weather data covering the identified region;

receive the set of supplemental weather data for the identified region covering the identified region at a rate consistent with the indicated response transmission bandwidth;

perform extrapolations of motions and trends of weather features in the identified region indicated in the weather forecast information; and update the supplemental weather display portion at a specific weather radar update rate of the weather radar system based on the extrapolations of motions and trends of weather features, until updated supplemental weather data is received at the rate consistent with the indicated response transmission bandwidth.

23. A method for providing supplemental weather radar coverage, the method comprising:

receiving, by one or more processors, weather data from one or more weather data sources;

receiving, by the one or more processors from a requesting weather radar system, a request for supplemental weather data covering an identified region, wherein the requesting weather radar system is associated with a specific weather radar data format;

identifying, by the one or more processors, a set of supplemental weather data for the identified region, based on the received weather data front the one or more weather data sources, wherein the set of supplemental weather data for the identified region is in the specific weather radar data format associated with the requesting weather radar system and comprises weather forecast information for the identified region; and outputting for transmission, by the one or more processors, the set of supplemental weather data for the identified region to the requesting weather radar system.

24. The method of claim 23, further comprising identifying the set of supplemental weather data for the identified region such that the weather forecast information for the identified region comprises data on one or more of: tangential motion of one or more weather features in the identified region; radial motion of the one or more weather features in the identified region; vertical motion of the one or more weather features in the identified region; and reflectivity trend of the one or more weather features in the identified region.

25. The method of claim 23, further comprising transmitting the supplemental weather data for the identified region at a lower transmission update rate than a specific weather radar data update rate associated with the requesting weather radar system, such that the weather forecast information for the identified region is sufficient to be extrapolated by the requesting weather radar system at the specific weather radar data update rate associated with the requesting weather radar system.

* * * * *

UNITED STATES PATENT AND TRADEMARK OFFICE
CERTIFICATE OF CORRECTION

PATENT NO.         : 9,952,310 B2
APPLICATION NO.    : 14/821547
DATED              : April 24, 2018
INVENTOR(S)        : Guoqing Wang, Haifeng Wang and Kenneth R. Jongsma Page 1 of 1

It is certified that error appears in the above-identified patent and that said Letters Patent is hereby corrected as shown below:

Column 24, Line 37 (Claim 7): Replace "configured lo transform the weather radar data" with --configured to transform the weather radar data--

Column 24, Line 62 (Claim 10): Replace "wherein the one Of more processors" with --wherein the one or more processors--

Column 25, Line 2 (Claim 10): Replace "one or more weal data sources;" with --one or more weather data sources;--

Column 27, Line 17 (Claim 23): Replace "weather data front the one" with --weather data from the one--

Signed and Sealed this
Seventeenth Day of July, 2018

Andrei Iancu
*Director of the United States Patent and Trademark Office*